United States Patent [19]

Bivens et al.

[11] 4,097,791
[45] Jun. 27, 1978

[54] DELAYED TURN-ON AND TURN-OFF CONTROL CIRCUIT

[75] Inventors: Ward L. Bivens, Painesville; Richard A. Schwehr, Mentor, both of Ohio

[73] Assignee: Towmotor Corporation, Mentor, Ohio

[21] Appl. No.: 636,785

[22] Filed: Dec. 1, 1975

[51] Int. Cl.$^2$ ............................................. H02P 1/04
[52] U.S. Cl. .................... 318/484; 318/452; 318/453; 318/447; 307/141; 307/141.4
[58] Field of Search ................. 318/62, 452, 454, 445, 318/484, 447; 307/141, 141.4, 293; 361/196, 197, 198

[56] References Cited
U.S. PATENT DOCUMENTS

| | | | |
|---|---|---|---|
| B 451,396 | 4/1976 | Nurnberg | 318/484 |
| 3,325,657 | 6/1967 | Corey | 307/141 |
| 3,582,732 | 6/1971 | Kovalsky | 307/141 |
| 3,755,695 | 8/1973 | Krick et al. | 307/141.4 |
| 3,784,881 | 1/1974 | Van Horn et al. | 307/293 |
| 3,814,948 | 6/1974 | Schuchmann et al. | 307/141 |
| 3,814,950 | 6/1974 | Adams | 307/141 |

Primary Examiner—James R. Scott
Assistant Examiner—Eugene S. Indyk
Attorney, Agent, or Firm—John W. Grant

[57] ABSTRACT

A delayed turn-on and turn-off control circuit for an electric motor includes a motor relay having an electrical actuator and a normally open motor contactor which is connected in series between the motor and an electrical power source for running the motor when the electrical actuator is energized. A normally non-conductive electrical switching device is serially connected between the electrical actuator and the power source. A turn-on delay circuit is responsive to closing of a normally open motor start switch and produces an electrical signal to render the electrical switching device conductive only after a predetermined lapse of time following the closing of the motor start switch, thereby energizing the motor. A turn-off delay circuit is responsive to opening of the motor start switch and produces an electrical signal to render the electrical switching device nonconductive only after a predetermined lapse of time following the opening of the motor start switch, thereby causing the motor to be deenergized.

4 Claims, 1 Drawing Figure

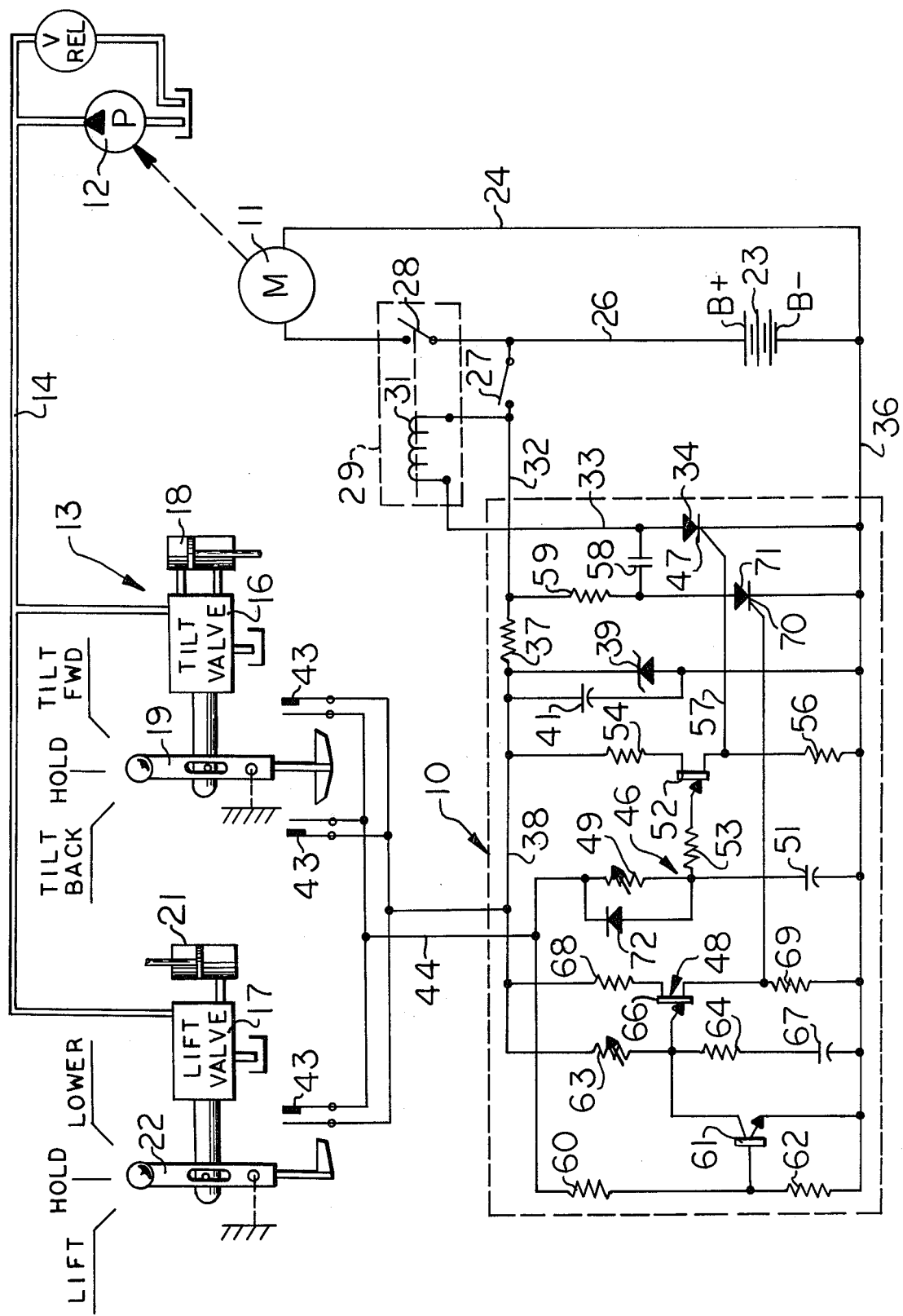

DELAYED TURN-ON AND TURN-OFF CONTROL CIRCUIT

Background of the Invention

This invention relates to a delayed turn-on and turn-off control circuit and more particularly to a control circuit for delaying the starting of an electric motor after a switch has been closed as well as delaying the shutting off of the motor after the switch has been opened.

Many electrically powered fork lift trucks have hydraulic systems for raising and lowering the forks and for tilting their masts relative to the supporting structure. Each of such vehicles commonly have a pump driven by a DC electric motor which is started and stopped by closing and opening of switches simultaneously with the opening and closing of a hydraulic control valve. These switches in turn actuate a power contactor in series with a DC motor. The hydraulic control valve normally has a spring centering arrangement for returning the valve spool to the neutral position when the control lever is released from an operating position. One of the problems encountered with those arrangements is that the control valves have a tendency to overshoot sufficiently to cause the switch contacts and the power contactor to close for a split second and then immediately open again. A DC electric motor typically draws a high peak current during initial starting, and the opening occurs during a time when the peak current is passing through the power contactor contacts and causes intense arcing. This causes rapid burning of the contacts and necessitates frequent replacement thereof. The rapid switching of the switch contacts is also frequently initiated by the operator when he attempts to feather the control valve with quick, short lever actuations for moving the fork or mast in small increments for precise positioning.

Normally, a time delayed relay would be used to solve this type of problem. However, such time delay relays heretofore available are too expensive, take up too much space, consume too much power and do not ensure that the power contactor remains closed until the starting current decays, as they do not apply power to the motor once the control switch is opened.

OBJECTS OF THE INVENTION

Accordingly, an object of this invention is to provide an improved delayed turn-on and turn-off control circuit for nullifying the rapid switching of a manually actuated motor start switch which is employed to start and stop an electric motor.

Another object of this invention is to provide such an improved delayed turn-on and turn-off control circuit for delaying the starting of the electric motor for a predetermined lapse of time after the motor start switch has been closed to prevent starting of the motor due to overshoot of the control lever.

Another object of this invention is to provide an improved delayed turn-on and turn-off control circuit of the character described for delaying the stopping of the motor for a predetermined lapse of time after the motor start switch has been closed so that the contactor controlling the current flow to the motor is not opened during periods of peak current flow to the motor.

Other objects and advantages of the present invention will become more readily apparent upon reference to the accompanying drawing and following description.

BRIEF DESCRIPTION OF THE DRAWING

The sole FIGURE is a schematic illustration of a delayed turn-on and turn-off control circuit embodying the principles of the present invention in association with an electric motor driving a hydraulic pump of a hydraulic system.

DESCRIPTION OF THE PREFERRED EMBODIMENT

Referring now to the drawing, a delayed turn-on and turn-off control circuit embodying the principles of the present invention is generally indicated by the reference numeral 10 in association with a DC electric motor 11 operatively connected to a hydraulic pump 12 of a hydraulic system 13 for an electrically powered lift truck, not shown. A conduit 14 connects the pump to a tilt control valve 16 and a lift control valve 17 for directing pressurized fluid thereto when the electric motor is running. The tilt valve is connected to the head end and rod end of a hydraulic jack 18 which is typically connected between the vehicle and the lift mast for tilting forwardly or rearwardly when a lever 19 connected to the valve is manually shifted from the HOLD position as shown to the tilt position indicated as TILT FWD or TILT BACK, respectively. The lift control valve is connected to the head end of a hydraulic jack 21 which is typically operatively connected to raise the forks under power when a lever 22 is shifted from the HOLD position to the position indicated as LIFT and permits gravity lowering of the forks when the lever is shifted to the LOWER position.

The electric motor 11 is connected across the B— and B+ terminals of an electric power source such as a battery 23 through a pair of lines 24 and 26, respectively. A motor contactor 28 is serially disposed within the line 26 and is an integral part of a motor start relay 29 which also includes an electrical actuator or actuating coil 31 operative to close the motor contactor when energized. One terminal of the coil is connected to a line 32 leading from the line 26 through a manually actuated key switch 27 while the other terminal of the coil is connected through a line 33 and a power SCR (silicon controlled rectifier) 34 to a B— line 36 connected to the line 24. Thus, with the key switch closed, turning on the power SCR energizes the motor relay and completes the circuit to run the electric motor which drives the pump 12 for pumping fluid through conduit 14.

A voltage dropping resistor 37 is connected between the line 32 and a line 38 and cooperates with a Zener diode 39 and a power supply filter capacitor 41 which are connected in parallel between the lines 38 and 36 to reduce the voltage in line 38 to a predetermined value regardless of the voltage of the battery 23. Typically, the battery voltage is in the range of 36 to 72 volts and the voltage at the line 38 is reduced to approximately 12 volts.

A plurality of normally open motor start switches 43 are each serially connected to the line 38 and to a common output line 44. Two of the motor start switches are positioned on opposite sides of the lever 19 to be individually closed by manipulation of the lever in the respective direction while one of the motor start switches is positioned to be closed by manipulation of the lever 22 to the LIFT position. The output line is connected to a turn-on delay circuit 46 which is connected to a control gate 47 of the power SCR 34 for turning on the power SCR only after a predetermined lapse of time following the closing of any one of the motor start switches. The output line is also connected to a turn-off delay circuit 48 which functions to delay turning off the power SCR a predetermined lapse of time following the opening of the motor start switch that was closed.

Upon closing of any one of the motor start switches 43 when the key switch 27 is in its closed position a current is directed through the output line 44 simultaneously to activate the turn-on delay circuit 46 and to disable the turn-off delay circuit 48 and maintin it in the disabled condition as long as the motor start switch remains closed. More specifically, the current flow from the output line passes through a variable timing resistor 49 and starts to charge a time delay capacitor 51. The junction of the resistor and capacitor is connected to the emitter of a unijunction transistor 52 through a current limiting resistor 53. One base terminal of the unijunction transistor is connected to the line 38 through a bias resistor 54 and the other base terminal being connected to the line 36 through a load resistor 56. After a brief delay which corresponds to the above-mentioned predetermined lapse of time and in this case is approximately 100 milliseconds, the voltage across the time delay capacitor reaches a predetermined magnitude or the trigger level of the unijunction transistor as determined by the bias resistor. This turns on the unijunction transistor and the time delay capacitor discharges rapidly through the current limiting resistor and unijunction transistor which directs a pulse signal through a line 57 to the control gate 47 of the power SCR 34. The load resistor 56 is connected between the lines 57 and 36 to normally keep the control gate of the power SCR low until the unijunction transistor fires, at which time it develops a trigger signal for turning on the power SCR. Turning on the power SCR engerzizes the motor relay 29 to close the contactor 28 and starts the electric motor 11. Although the unijunction transistor ceases to conduct as soon as the emitter of the unijunction transistor reaches a predetermined minimum current in view of the capacitor having discharged, the power SCR will remain conducting so long as the current flow therethrough is above its holding value. Also, the turning on of the power SCR connects a commutating capacitor 58 to the B− line so that the commutating capacitor becomes charged to the battery voltage by current flowing through a current limiting resistor 59 from the line 32 for a later defined purpose.

The current flow through the output line 44 upon closing of one of the motor start switches 43 passes through a current limiting resistor 60 of the turn-off delay circuit 48 to the base of a conducting NPN transistor switch 61. A base bias resistance 62 is connected between the B− line 36 and the junction of the current limiting resistor 60 and the base of the transistor switch. The emitter of the transistor switch is coupled to the line 36 while its collector is coupled to the junction of a variable timing resistor 63, a current limiting resistor 64 and the emitter of a unijunction transistor 66. The current flow to the base of the transistor switch 61 turns it on so that the variable resistor is connected to the B− line, thereby disabling the turn-off delay circuit 48 while the motor start switch is closed.

Opening the motor start switch that has been closed stops current flow to the base of the transistor switch 61 turning it off. If the motor start switch 43 had been closed a sufficient length of time for the power SCR 34 to have been turned on, opening of the closed motor start switch starts a time sequence for delaying the turning off of the power SCR a predetermined lapse of time and thus delays de-energizing the motor relay 29 and stopping of the motor 11. More specifically, when the transistor switch is turned off, the current flow through the timing resistor 63 immediately starts to pass through the current limiting resistor 64 and begins charging a time delay capacitor 67. When the voltage across the time delay capacitor reaches a predetermined magnitude or the trigger level of the unijunction transistor 66 as determined by a bias resistor 68 connected between one base terminal of the unijunction transistor and the line 38, the unijunction transistor will turn on so that the current flows therethrough and through a load resistor 69 which connects the other base terminal to the B− line 36. This develops a pulse trigger signal to a control gate 70 of a commutating SCR 71 turning it on. The commutating SCR is connected to the junction of the fully charged commutating capacitor 58 and resistor 59 so that the capacitor 58 is discharged through the commutating SCR and applies a reverse bias to the power SCR 34 turning it off. The size of the resistor 59 is selected firstly to drop the current flow through the commutating SCR below its holding value when the capacitor 58 is in a discharged condition so that the commutating SCR turns off in the absence of the gate signal and secondly to permit the capacitor 58 to become charged in less time than the delay time of the turn-off delay circuit. The delay time for turning off the power SCR after the closed motor start switch is opened is determined by the value of the variable timing resistor 63 and the time delay capacitor 67 and in the present case is approximately 300 milliseconds.

The instant the capacitor 67 becomes discharged to a predetermined minimum voltage upon the turning on of the unijunction transistor 66, the unijunction transistor is turned off and the capacitor again starts to recharge. Thus, the turn-off delay timing circuit 48 functions as a free running oscillator when all of the motor start switches 43 are open resulting in repeated gating of the commutating SCR 71 at intervals determined by the delay time so long as the switch 27 is closed. This is beneficial in the event the power SCR 34 fails to turn off properly on the first pulse trigger signal to its control gate 70.

A diode 72 is connected in parallel with the timing resistor 49 and provides a leakage path for the charge on the time delay capacitor 51 through the resistor 60 and base emitter circuit of the transistor switch 61 after the pulse from the unijunction transistor 52 ends. This prevents the capacitor 51 from retaining a partial charge which would shorten the turn-on delay and insure that the capacitor 51 always starts from zero charge in establishing the turn-on delay. Similarly, the instant the transistor switch 61 is turned on upon closing of any of the motor start switches 43, a leakage path is provided through the resistor 64 and the transistor switch discharging the time delay capacitor 67 and insures that the capacitor 67 starts from zero charge in establishing the turn-off delay.

In view of the foregoing, it is readily apparent that the structure of the present invention provides an improved delayed turn-on and turn-off control circuit for nullifying the rapid switching of a manually actuated motor start switch which is employed for starting and stopping an electric motor. A turn-on delay circuit is connected between the motor start switch and a power SCR to delay energizing the motor relay until a predetermined lapse of time following the motor start switch closure to prevent starting of the electric motor due to overshoot of the control lever caused by the resilient centering mechanism. Also, once the motor relay has been energized, a turn-off delay circuit prevents de-energization thereof until a predetermined lapse of time following motor start switch opening so that the contactor of the motor relay controlling the current flow to the electric motor is not opened during a period of peak current flow to the motor. The control circuit is constructed from inexpensive electronic components and includes a voltage reducing apparatus so that the motor start switches and the majority of the components of the control circuit are subject to only the very low currents required by the electronic control circuit. This minimizes problems of burning the contacts of the motor start switches which would otherwise have to carry the current through the start relay coil.

While the invention has been described and shown with particular reference to the preferred embodiment, it will be apparent that variations might be possible that would fall within the scope of the present invention which is not intended to be limited except as defined in the following claims.

What is claimed is:

1. A delayed turn-on and turn-off control circuit for an electric motor comprising:

an electrical power source having a positive terminal and a ground terminal;

a motor relay having a normally open contactor connected in series between the electric motor and one of the terminals of the power source, said contactor being movable between an opened position at which the electric motor is disconnected from the power source and a closed position at which the electric motor is connected to the power source, and an electrical actuator means connected to the contactor for moving the contactor to the closed position in response to said actuator means being energized and to said opened position in response to said actuator means being de-energized;

means for providing an electrical current at a predetermined value;

a motor start switch connected to the current providing means and being movable between a normally open position and a closed position;

a power silicon controlled rectifier connected in series between the electrical actuator means and the ground terminal of the power source for energizing the electrical actuator means in response to receiving a first electrical signal and for de-energizing the electrical actuator means in response to receiving a second electrical signal, said power silicon control rectifier having a control gate for receiving the first electrical signal;

a turn-on delay means connected to the motor start switch and to the control gate of the power silicon controlled rectifier for delivering said first electrical signal to the control gate only after the running of a first predetermined period of time after the closing of the motor start switch;

a turn-off delay means connected to the motor start switch and to the power silicon controlled rectifier for delivering said second signal to the power silicon controlled rectifier only after the running of a second predetermined period of time after the opening of the motor start switch, said turn-off delay means including a commutating capacitor, means to charge the commutating capacitor to the voltage of the power source only when the power silicon controlled recitifer is conductive, a commutating silicon controlled rectifier connected between the commutating capacitor and the grounded side of the power silicon controlled rectifier, means for gating on the commutating silicon controlled rectifier after said second predetermined period of time following the opening of the switch for providing a reverse bias on the power silicon controlled rectifier as the second electrical signal for rendering it nonconductive, and means for disabling the turn-off delay means in response to the normally open start switch being closed and for initiating the running of the second predetermined period of time in response to the motor start switch being opened; and wherein said gating on means includes a time delay capacitor, a timing resistor connected between the electrical current providing means and the time delay capacitor for charging the time delay capacitor, and means for discharging the time delay capacitor to the control gate of the commutating silicon controlled rectifier in response to the voltage across the time delay capacitor reaching a predetermined value, said discharging means including a unijunction transistor and a load resistor, said unijunction transistor having its emitter connected to the time delay capacitor and one of its bases connected to the control gate of the commutating silicon controlled rectifier, said load resistor being connected to said one base of the unijunction transistor, a control gate of the commutating silicon controlled rectifier and to the ground terminal for keeping the control gate voltage low until the unijunction transistor is turned on.

2. The control circuit of claim 1 wherein the disabling means includes a transistor switch having its emitter connected to the ground terminal, its collector connected to the timing resistor and the time delay capacitor, and its base connected to the motor start switch so that the transistor switch is turned on when the motor start switch is closed for connecting the timing resistor and the time delay capacitor to the ground terminal.

3. The control circuit of claim 2 wherein the means to charge the commutating capacitor includes a current limiting resistor disposed between the positive terminal and both the commutating capacitor and the commutating silicon controlled rectifier with the size of the current limiting resistor being selected to drop the current through the commutating silicon controlled rectifier below its holding value when the commutating capacitor is fully discharged.

4. The control circuit of claim 1 wherein the turn-on delay means includes a second time delay capacitor, a timing resistor connected between the second time delay capacitor and the motor start switch for charging the capacitor in response to closing of the motor start switch, a unijunction transistor having its emitter connected to the timing resistor and the second time delay capacitor and one of its bases connected to the control gate of the power silicon controlled rectifier for discharging the second time delay capacitor to the control gate of the power silicon controlled rectifier for rendering it conductive in response to the voltage across the second time delay capacitor reaching a predetermined value.

* * * * *